United States Patent [19]

Yatrou et al.

[11] Patent Number: 5,343,522
[45] Date of Patent: Aug. 30, 1994

[54] ADAPTIVE SPARSE ECHO CANCELLER USING A SUB-RATE FILTER FOR ACTIVE TAP SELECTION

[75] Inventors: Paul M. Yatrou, Montreal; Douglas J. Millar, Verdun, both of Canada

[73] Assignee: Northern Telecom Limited, Montreal, Canada

[21] Appl. No.: 894,377

[22] Filed: Jun. 4, 1992

[30] Foreign Application Priority Data

Feb. 5, 1992 [CA] Canada .................................. 2060667

[51] Int. Cl.$^5$ ............................................. H04B 3/23
[52] U.S. Cl. .................................. 379/410; 379/406; 370/32.1
[58] Field of Search ............... 379/406, 410, 411, 345; 370/32, 32.1

[56] References Cited

U.S. PATENT DOCUMENTS

| | | | |
|---|---|---|---|
| 4,644,108 | 2/1987 | Crouse et al. | 379/406 |
| 4,805,215 | 2/1989 | Miller | 379/411 |
| 4,823,382 | 4/1989 | Martinez | 379/411 |
| 4,903,247 | 2/1990 | Van Gerwen et al. | 379/411 |
| 4,951,269 | 8/1990 | Amano et al. | 379/406 |
| 5,029,167 | 7/1991 | Arnon et al. | 379/406 |
| 5,146,494 | 9/1992 | Harman | 379/406 |

OTHER PUBLICATIONS

"A DSP-Based Echo-Canceller with Two Adaptive Filters", IEEE ICASSP '86, pp. 46.8.1–46.8.5 by H. Chang et al.

"Subsampling to Estimate Delay with application to Echo Cancelling", IEEE Trans. ASSP, vol. 31, No. 5, Oct. 1983 by D. L. Duttweiler.

"Dynamically-reduced Complexity Implementation of Echo Cancellers", IEEE ICASSP '86, pp. 26.4.1–26.4.4 by V. K. Madisetti et al.

"Analysis of an Adaptive Technique for Modellling Sparse Systems", IEEE Trans. ASSP, vol. 37, No. 2, Feb. 1989 by Y-F Cheng.

Primary Examiner—James L. Dwyer
Assistant Examiner—Scott L. Weaver
Attorney, Agent, or Firm—Jean-Pierre Fortin

[57] ABSTRACT

With the presently described echo canceller, a sparse adaptive transversal filter is used to model and cancel only the active regions of the echo impulse response. Since the tap coefficients, in the dormant regions, are set to zero and have no random fluctuation this approach reduces computation time and excess mean-square error in the tap coefficients. Also, the present design provides for increased speed of convergence of the sparse canceller as compared to the full-tap canceller, since convergence is proportional to the number of active taps in the LMS algorithm.

3 Claims, 3 Drawing Sheets

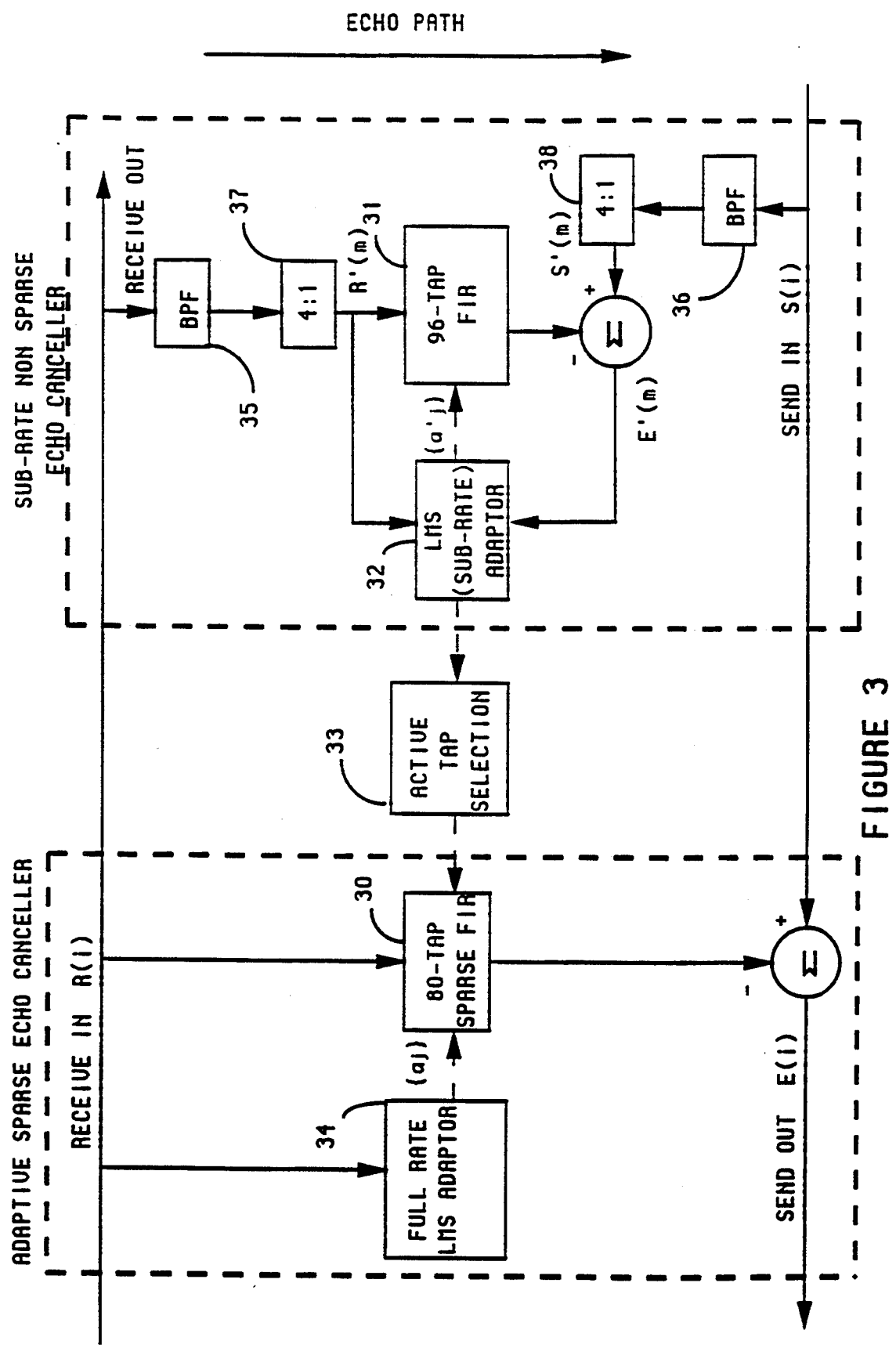

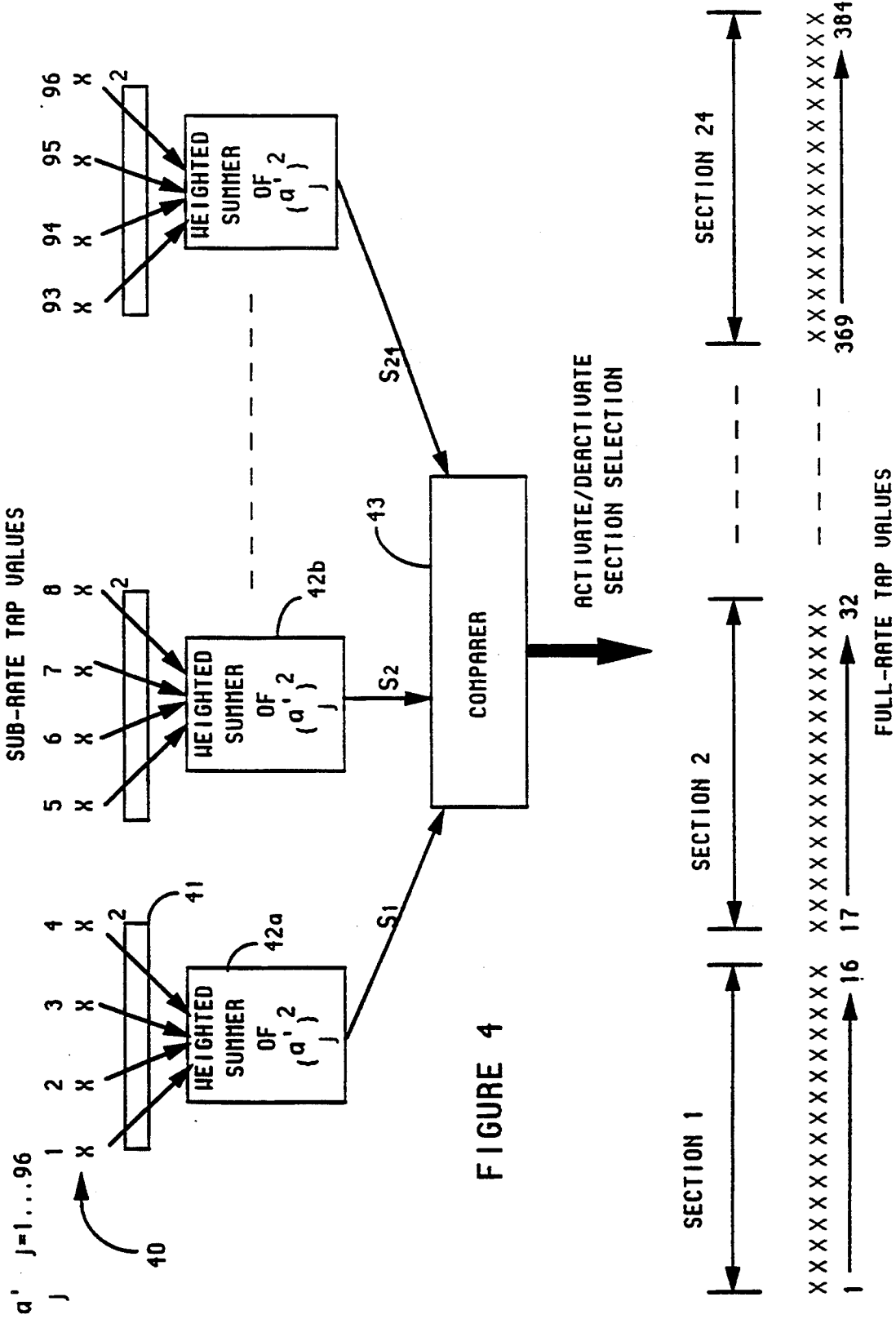

ADAPTIVE SPARSE ECHO CANCELLER USING A SUB-RATE FILTER FOR ACTIVE TAP SELECTION

FIELD OF THE INVENTION

This invention relates to echo cancellation for communication systems, but more particularly to echo cancellation for radio communication systems and the like.

BACKGROUND OF THE INVENTION

Echoes, or distorted and delayed reflections of an incident signal, are produced wherever there are impedance mismatches in a transmission system. In the public switched telephone network (PSTN), impedance mismatches exist primarily at the 2-to-4 wire hybrid interfaces. In a typical end-to-end PSTN connection, echoes of the speech signal are returned to the talker via the transmission path on which the talker is listening (this is referred to as "talker" echo). Echoes can become annoying if they are loud; but more importantly, if they are sufficiently delayed and therefore distinguishable from sidetone (normal feedback of the talker's voice from the microphone to the speaker of a telephone handset), echoes can become intolerable.

In most landline PSTN connections, the delay is short and echoes do not impair the communication. In cellular mobile communications, however, both the speech coding process and radio transmission add significant delays to the signal path (a round trip delay of over 100 ms. is possible). This can result in a severe talker echo problem for the mobile terminal user. Note that the landline user is less prone to the problem of talker echo because there are practically no impedance mismatches at the mobile end to reflect the speech signal).

An echo canceller, in general, operates by modelling the impulse response of the echo path, and using this model to cancel out the echo component from the signal returning to the mobile (i.e. send-out signal). If the echo path is assumed to be linear, the common transversal tap FIR filter and LMS adaptation algorithm can be used. Normally, a large number of taps are required to cover the maximum circuit length of an echo path, determined by the last non-zero sample in its impulse response, which could reach 48 ms for some calls. However, the impulse response of a typical echo path, looking into the PSTN, contains only a few regions of non-zero sample magnitudes (hereby called active regions) which are related to the points of reflection in the transmission path caused by the 2-to-4 wire hybrid interfaces. With a non-sparse echo canceller, a large portion of the computation is spent on modelling the zero samples, or dormant regions, of the impulse response.

DESCRIPTION OF THE PRIOR ART

Echo canceller structures in which two full-rate adaptive filters are used to model and cancel the echo path are described in papers by K. Ochiai, T. Araseki, and T. Ogihara, "Echo canceller with two echo path models", IEEE Trans. Comm., vol. 25, no. 6, Jun. 1977 and by H. Chang and B. P. Agrawal, "A DSP-based Echo-canceller with Two Adaptive Filters", IEEE ICASSP '86, pp. 46.8.1–46.8.5. The two filters, called background and foreground, operate in a somewhat complicated convergence procedure where only one of the two is being adapted at any time. These systems can handle a maximum delay of 36 ms. (28 ms. flat delay plus 8 ms. of active region). There is also a restriction on the placement of taps to cover the active regions.

In a paper by D. L. Duttweiler, "Subsampling to Estimate Delay with Application to Echo Cancelling", IEEE Trans. ASSP, vol. 31, no. 5, Oct. 1983, there is described a subsampled adaptive filter to accurately estimate the delay of a single echo, or active region, and a short echo canceller is then used to cancel the echo. However, the problem of multiple echoes is not addressed.

The paper by V. K. Madisetti, D. G. Messerschmitt, and N. Nordstrom, "Dynamically-reduced Complexity Implementation of Echo Cancellers", IEEE ICASSP '86, 26.4.1–26.4.4, describes how the entire echo path is searched in a fixed pattern with a small moving adaptive filter. When an active region is found, it is activated in the sparse adaptive filter doing the cancelling. This algorithm is shown to converge for small enough stepsizes and for echo paths which may vary slowly enough in time. Although this scheme shows some improvements over a simple full-rate echo canceller, it is quite inefficient.

In the paper by Y-F Cheng and D. M. Etter, "Analysis of an adaptive technique for modelling sparse systems", IEEE Trans. ASSP, vol. 37, no. 2, Feb. 1989, a theoretical treatment of a fully flexible sparse modelling technique which finds the active regions a single tap at a time is described. The technique is very accurate but computationally complex and not amenable to a DSP implementation for echo cancellation.

SUMMARY OF THE INVENTION

With the presently described echo canceller, a sparse adaptive transversal filter is used to model and cancel only the active regions of the echo impulse response. Thus, this approach has the advantages of not only reducing computation time, but also reducing excess mean-square error in the tap coefficients, since in the dormant regions the coefficients are set to zero and have no random fluctuation. Also, the present design provides for increased speed of convergence of the sparse canceller as compared to the full-tap canceller, since convergence is proportional to the number of active taps in the LMS algorithm.

It is therefore an object of the present invention to provide an improved echo canceller which reduces the computation time necessary to cancel echo impulses.

According to a first aspect of the invention, there is provided an improved echo canceller, comprising:
  sub-rate filter means for providing an estimation and identification of active regions in an echo path; and
  full-rate sparse adaptive filter means having a plurality of active taps which are selected according to said active regions such that echo impulses on said echo path can be estimated and cancelled.

According to a second aspect of the present invention, there is provided a method of operating an echo canceller to reduce computation time necessary to cancel echo impulses, comprising the steps of:
  receiving said echo impulses at sub-rate filter means;
  estimating and identifying active regions of said echo impulses;
  selecting a plurality of active taps according said estimated active regions; and
  adjusting an adaptive sparse echo canceller according to said selected active taps, such that said echo impulses can be cancelled.

BRIEF DESCRIPTION OF THE DRAWINGS

FIG. 3 is a block diagram illustrating the echo canceller of the present invention; and FIG. 4 is a block diagram illustrating the operation of the active tap selection circuit of FIG. 3.

DESCRIPTION OF THE PREFERRED EMBODIMENT

Figure 1:
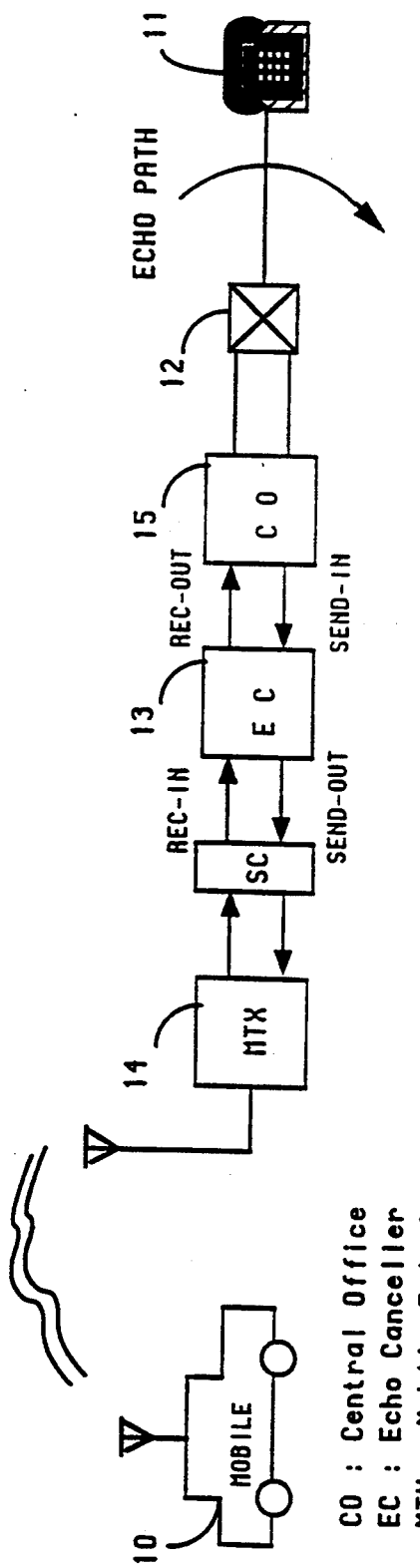
FIG. 1 illustrates an example of an echo canceller application.

FIG. 1 illustrates the use of an echo canceller in a signal path between a mobile subscriber 10 and a standard wired telephone 11 connected in the Public Switched Telephone Network (PSTN). In most landline connections, i.e. between telephone 11 and the PSTN hybrid 12, the delay is short and echoes do not impair the communication. However, in cellular mobile communications, both the speech coding process and radio transmission add significant delays to the signal path. This results in severe talker echo problems for the mobile subscriber 10 due to reflections in the PSTN hybrids at 11 and 12. In order to eliminate the echoes, an echo canceller 13 must therefore be placed between the mobile switch 14 and the central office 15 of the PSTN.

Figure 2:
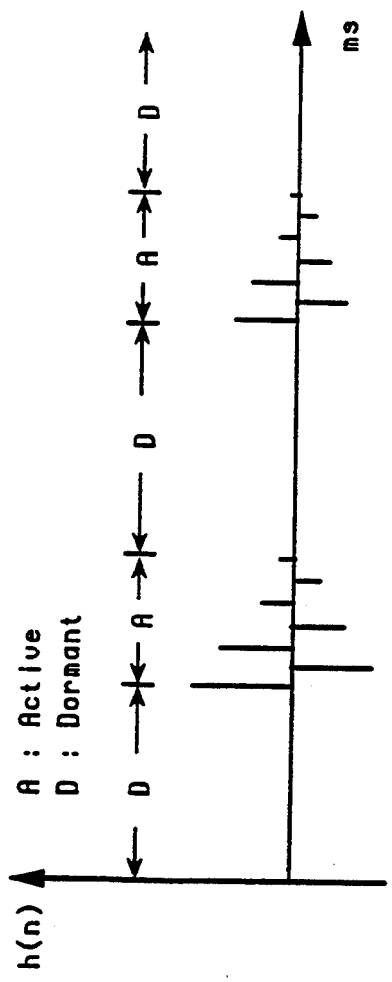
FIG. 2 shows a typical echo path impulse response.

The graph shown in FIG. 2, illustrates a typical echo impulse response of an echo path in the PSTN. As is shown, the impulse response of a typical echo path, looking into the PSTN, contains only a few regions, (labelled A for active regions), of non-zero samples, which are related to points of reflection in the transmission path caused by the 2-to-4 wire hybrids. With a full-tap echo canceller, a large portion of the computation is spent on modelling the zero samples, or dormant regions (labelled D), of the impulse response.

Referring now to FIG. 3, we have shown a block diagram of the echo canceller of the present invention. The proposed design uses a sparse adaptive transversal filter 30 to model and cancel only the active regions of the echo impulse response. In the description which follows, an 8 kHz sampling frequency has been assumed. It will however be known to those knowledgeable in this art that other sampling frequencies can also be used without departing from the scope of the present invention. Generally, the main components of the proposed echo canceller design comprises a quarter-rate sub-sampled 96-tap adaptive filter 31 used for providing a rough echo path estimation and identification of active regions, an LMS adaptor 32 for sub-rate taps, an active tap selection circuit 33, an LMS adaptor 34 for full rate taps and a full-rate 80-tap sparse adaptive filter 30 used for precise echo path estimation and cancellation. In this design, 80 active taps are used to cancel over a 384 sample or 48 ms range in the echo path. The 384 sample range is divided into 24 contiguous regions, each containing 16 taps, and at any given time only 5 of the 24 regions are active. As indicated above, a quarter-rate echo canceller with a 96-tap (384/4) adaptive transversal filter 31 is used to roughly estimate the impulse response over the entire 48 ms. range.

In a system as defined above, i.e. comprising 5 (possibly separated) sets of 16 taps over a span of 384 samples, the active regions are forced to occupy 5 of 24 distinct contiguous group of 16 samples by a selection algorithm based on the sub-rate tap magnitudes. The full-rate FIR canceller makes use of the following equation:

$$E(i) = S(i) - \mathrm{Sum}_j(a_j(i) * R(i - j))$$

where index j refers to samples in the active regions, "E" represents residual echo, "R" represents the received in signal sample values, "i" represents the full rate tap sampling index, and "S" represents the squared magnitudes of sample values.

Adaptation of the full-rate taps, at the LMS adaptor 34, is done using a modified stochastic gradient algorithm. It makes use of the following equation:

$$D(i) = (1 - 2Tc) * D(i - 1) + 2Tc * \mathrm{Sum}_k(R(k)^\wedge 2 + R(k - 1)^\wedge 2)/10$$

$$a_j(i + 1) = a_j(i) + .5 * B * E(i) * R(i - j)/(16 * \mathrm{Max}(D(i), S(i)^\wedge 2))$$

The parameter values are Tc=1/16, B=0.5 and R(k), k=1 to 5, represent the 5 leading R(i) samples which have just entered the 5 active sections, D(i) represents an energy estimate of the received in signal. The calculation of D(i) and tap adaptation is done every second sample.

For the sub-rate system, the primed notation (') is used for signals and taps. A new sub-sampled time index m, is also used, where 1 m spans 4 i. In the system described above, the filter is comprised of 96 contiguous taps. The sub-rate FIR canceller makes use of the following equation:

$$E'(m) = S'(m) - \mathrm{Sum}_{j=1}^{96}(a_j'(m) * R'(m - j))$$

Adaptation of the sub-rate taps, at the LMS adaptor 32, is also done using a modified stochastic gradient algorithm. It uses the following equations:

$$D'(m) = (1 - Tc') * D'(m - 1) + Tc' * R'(m)^\wedge 2$$

$$a_j'(m + 1) = a_j'(m) + .5 * B' * E'(m) * R'(m - j)/(96 * \mathrm{Max}(D'(m), S'(m)^\wedge 2)),$$

$$j = 1 \ldots 96$$

The parameter values are Tc'=1/96 and B'=0.5.

The D'(m) calculation is done every sample, 2000 times per second. The tap update is performed every second sample, 1000 times per second.

The input signals to the filter 31 are band-pass filtered from 2 to 3 kHz by filters 35 and 36 and downsampled by subsampling circuits 37 and 38, respectively. The 2–3 kHz integral band is ideal for estimating the echo path with a speech signal because strong correlations due to the formant regions of speech are avoided in the calculation. Formant regions are ranges of frequencies in the speech spectrum which have high energy corresponding to resonances in the articulatory system and the mouth cavity. In choosing a 1 khz band for estimating the echo path, the 1–2 khz region can be avoided due to the presence of strong formants. The 2–3 khz band is generally flatter and therefore better suited for estimation via an LMS-type algorithm. Although this model is not precise enough for echo cancellation, it can be used as an indicator of the position of the active regions in the echo path.

As is shown in FIG. 4, the sub-rate taps are divided into 24 contiguous regions of 4 taps each (time aligned with the 24 full-rate regions) and every 2 ms., the tap magnitudes 40 are each squared by squaring circuit 41 and weighted by multiplying the squared value by a constant, before being summed at summer circuit 42a within each region. The equation which provides an indication of the section activity is given by:

$$S_k = \mathop{\text{Sum}}_{n=1}^{4}(a'_{4*(k-1)+n}(m)^\wedge 2 * w(n)), k = 1 \ldots 24$$

$$(w(1), w(2), w(3), w(4)) = (8, 12, 16, 16)$$

For example, summer circuit 42a provides a sum of the weighted squared values (w) for the sub-rate tap values $a_j'$, $j=1\ldots 4$, summer circuit 42b provides a sum of the weighted squared values for the sub-rate tap values $a_j'$, $j=5\ldots 8$, etc. This is done every 16 samples (500 times per second). The comparer circuit 43 will find the largest sum over dormant sections $S_i$ and it will find the smallest sum over active sections $S_j$. Using this information, the active region with the lowest sum is deactivated and the dormant region with the largest sum is activated, but only if the latter is greater than the former. That is, if $S_i > S_j$, then section j is deactivated and section i is activated. In general, there are 5 active and 19 inactive sections.

Newly activated full-rate sections are initialized with zero full-rate tap values. The algorithm is able to continuously track stationary or varying multiple echoes without any initial time-delay estimate or other initializations.

What is claimed is:

1. A method of operating an echo canceller to reduce computation time necessary to cancel echo impulses having active and dormant regions, comprising the steps of:
   a) receiving said echo impulses at a quarter rate sub-sampled 96-tap adaptive filter;
   b) estimating and identifying active regions of said echo impulses;
   c) selecting a plurality of active taps according to said estimated active regions, by:
      i) dividing a plurality of sub-rate taps into multiple contiguous regions, each contiguous region comprising an equal number of sub-rate taps;
      ii) squaring a magnitude of each sub-rate tap;
      iii) summing, for each contiguous region, the squared magnitudes of said sub-rate taps;
      iv) comparing each sum to:
         I) find a largest sum $S_i$ for each dormant region; and
         II) find a smallest sum $S_j$ for each active region; and
   d) adjusting a full-rate 80 tap sparse adaptive filter with a laser means square full-rate adaptor according to said selected active taps, by:
      i) deactivating an active region found to have the smallest sum; and
      ii) activating a dormant region found to have the largest sum, if $S_i$ is greater than $S_j$, such that said echo impulses can be cancelled.

2. An echo canceller adapted to reduce computation time necessary to cancel echo impulses having active and dormant regions, comprising:
   a) a sub-rate non-sparse echo canceller for receiving band pass filtered, sub-sampled echo impulses, said echo canceller having a quarter rate sub-sampled 96-tap adaptive filter and a sub-rate least means square adaptor for use in adapting sub-rate taps in selection of active regions;
   b) an active tap selection circuit connected to said least means square adaptor, wherein said sub-rate taps are divided into multiple contiguous regions, each contiguous region comprising an equal number of sub-rate taps, a magnitude of each sub-rate tap is squared and summed for each contiguous region and a largest sum $S_i$ for each dormant region and a smallest sum to each other sum $S_j$ for each active region is found by comparing each sum; and
   c) an adaptive sparse echo canceller having a full-rate 80-tap sparse adaptive filter connected to a full-rate least means square adaptor for providing echo path estimation and cancellation, wherein said adaptive sparse echo canceller is adjusted according to active taps selected by the active tap selection circuit, wherein active regions found to have the smallest sum are deactivated and dormant regions found to have the largest sum are activated, if $S_i$ is greater than $S_j$.

3. An echo canceller as defined in claim 2, wherein said echo impulses are band pass filtered and sub-sampled by means of a 2 to 3 KHz band pass filter and a 4 to 1 sub-sampling circuit, respectively.

* * * * *